United States Patent [19]
Takeishi

[11] Patent Number: 5,768,494
[45] Date of Patent: Jun. 16, 1998

[54] METHOD OF CORRECTING READ ERROR IN DIGITAL DATA PROCESSING SYSTEM BY IMPLEMENTING A PREDETERMIND NUMBER OF DATA READ RETRIALS

[75] Inventor: Morio Takeishi, Tokyo, Japan

[73] Assignee: NEC Corporation, Tokyo, Japan

[21] Appl. No.: 741,658

[22] Filed: Sep. 24, 1996

Related U.S. Application Data

[63] Continuation of Ser. No. 378,871, Jan. 24, 1995, abandoned, which is a continuation of Ser. No. 914,570, Jul. 17, 1992, abandoned.

[30] Foreign Application Priority Data

Jul. 17, 1991 [JP] Japan ..................... 3-202532

[51] Int. Cl.⁶ ............... G06F 11/00; G06F 11/14
[52] U.S. Cl. ..................... 395/182.15; 395/182.14
[58] Field of Search .............. 371/40.11, 40.12, 371/40.13, 40.14, 40.15, 40.16, 40.17, 40.18, 40.2, 40.3, 40.4, 69.1; 395/182.15, 182.14

[56] References Cited

U.S. PATENT DOCUMENTS

| | | |
|---|---|---|
| 3,958,220 | 5/1976 | Marshall ..................... 371/40.3 |
| 3,984,814 | 10/1976 | Bailey, Jr. et al. ............ 395/575 |
| 4,870,643 | 9/1989 | Bultmann et al. ............. 371/11.1 |
| 4,916,701 | 4/1990 | Eggenberger et al. ......... 371/37.7 |
| 5,231,638 | 7/1993 | Fujiki ............................ 371/40.3 |
| 5,267,241 | 11/1993 | Kowal .......................... 371/5.3 |

*Primary Examiner*—Robert W. Beausoliel, Jr.
*Assistant Examiner*—P. Vales
*Attorney, Agent, or Firm*—Foley & Lardner

[57] ABSTRACT

In order to effectively avoid faulty or false read error corrections in a digital data processing system, a check is made to see if the number of data read retrials reaches a preset number whose value is less than the maximum number of data read retrials. This checking limits the number of routine runs which can pass through an execution step wherein a check for an uncorrectable error is conducted, to a value which is markedly lower than that of the prior art. Further, if the routine passes once through a flag setting step wherein a flag is set to a preset logic level in the event that an error correcting length exceeds a length of data retrieved from a memory, all checking for uncorrectable errors is by-passed. Hence, the possibility that an uncorrectable error will be erroneously detected an a correctable one is greatly reduced or eliminated.

3 Claims, 3 Drawing Sheets

METHOD OF CORRECTING READ ERROR IN DIGITAL DATA PROCESSING SYSTEM BY IMPLEMENTING A PREDETERMIND NUMBER OF DATA READ RETRIALS

This application is a continuation of application Ser. No. 08/378,871, filed Jan. 24, 1995, now abandoned, which is a continuation of application Ser. No. 07/914,570, filed Jul. 17, 1992, now abandoned.

BACKGROUND OF THE INVENTION

1. Field of the Invention

The present invention relates generally to a method of correcting read errors in a digital data processing system, and more specifically to a method of correcting read errors when retrieving data from a secondary storage in a computer system. The present invention it directed to the effective avoidance of faulty or false read error corrections.

2. Description of the Prior Art

Magnetic media of a computer system, such as a magnetic tape and disk (viz., secondary storage), can make errors occasionally due to various causes such as physical defects or dust on the recording surface, etc. To guard against such errors, error-detecting or error-correcting codes are used. So-called Fire codes have been found advantageous for single-burst-error correction of magnetic recording devices.

However, with the recent noticeable evolution in magnetic recording devices with respect to storage capacity, data read errors now exhibit a variety of forms and may occur randomly in terms of time and storage locations rather than a single-burst-error.

According to a known error correcting method, upon a data read error being detected, the data read is automatically retried or repeated on the some memory location to determine that a read error is found correcteable until the number of read retrials reaches a predetermined number. If read errors are eventually determined uncorrectable after the predetermined number of retrials, the error correction is concluded to be impossible and the correction routine is terminated.

Before turning to the present invention it is deemed advantageous to describe the known error correction system with reference to a flowchart shown in FIG. 1.

A predetermined length of data is read out of a secondary storage (not shown) such as a magnetic tape and disk (step 10). Following this, a check is made to see if there is a read error at step 12. If no read error is found, the routine then ends at step 13. Otherwise, the program goes on to step 14 wherein the number of read retrials (depicted by Rr) is incremented by one. It should be noted that the number of read retrials is reset (viz., set to zero) before firstly entering into the routine depicted in the flowchart of FIG. 1. From step 14, the program proceeds to step 16 wherein a check is made to sea if the read error is correctable or not. If the read error is indicated as being correctable at step 16, suitable error correcting information is produced. Thus, an error correcting operation is implemented at steps 18, 20 using an error correcting pattern. Following this, the program ends at step 21.

If the outcome of the inquiry performed at step 16 is affirmative (viz., the read error is determined uncorrectable), a check is made to see if Rr is equal to or greater than a preset number (e.g., ton) at step 22. In the event of a negative outcome at step 22, then a data read retrial is induced at step 24 and the routine goes back to step 10.

In the event that the number of read retrials is found to have reached Rr at step 22 and an affirmative answer "yes" is produced at step 22, then it is determined that the data correction is definitely uncorrectable and the routine proceeds from step 22 to step 25.

With the above mentioned prior art, if the read error is detected at step 12, a check is unconditionally made if the error can be corrected at step 16. Accordingly, there is the possibility that an uncorrectable error is erroneously determined correctable. More specifically, the error correcting information includes an error correcting (byte) length in addition to the aforesaid error correcting pattern. The error correcting length indicates a data length over which an error correction is to be implemented using the error correcting pattern. The error correcting byte (or bit) length may exceed the length of the data retrieved. In this case, if the read error is detected correctable at step 16, faulty or false read error corrections are undesirably induced.

In addition to the above, there is the possibility, during a number of read retrials, that a read error which is uncorrectable is erroneously determined correctable at step 16.

Accordingly, the known error detecting method has encountered the problem that the error correction is erroneously implemented.

SUMMARY OF THE INVENTION

It in an object of the present invention to provide a method of effectively avoiding faulty or false read error corrections in a digital date processing system.

In brief, the above object is achieved by a method wherein a check is made to see if the number of data read for retrials reaches a preset number whose value is less than the maximum number of data read retrials. This checking limits the number of routine runs which can pass through an execution step wherein a check for an uncorrectable error is conducted, to a value which is markedly lower than that of the prior art. Further, if the routine passes once through a flag setting step wherein a flag is set to a preset logic level in the event that an error correcting position is detected to be out of a length of data retrieved from a memory, all checking for uncorrectable errors is by-passed. Hence, the possibility that an uncorrectable error will be erroneously detected as a correctable one is greatly reduced or eliminated.

More specifically, a first embodiment of the present invention comes in a method of correcting a data read error by implementing a predetermined number of data read retrials in a digital data processing system, comprising the steps of: (a) reading a predetermined length of data out of a memory; (b) checking to see it a read error is detected in the data which has been read out of the memory; (c) checking to see if an indicator exhibits a first demonstration that a data correcting location is out of the predetermined length or a second demonstration that the data correcting location is within the predetermined length; (d) checking to see if the read error is uncorrectable in the event that the indicator exhibits the second demonstration at step (c); (e) producing error correcting information, which includes the data correcting location, in the event that the read error is determined correctable at step (d); (f) checking to see if the data correcting location is out of the predetermined length; (g) performing error correction using the error correcting information in the event that the data correcting location is detected within the predetermined length at step (f); (h) setting the first demonstration to the indicator if the data correcting location is detected to be out of the predetermined length at step (f); (i) checking to see if the number of the data read retrials reaches a first predetermined number after step (g) and in the event that the indicator exhibits the first demonstration at step (c) and in the event that the read error is determined uncorrectable at step (d); and (j) implementing the data read retrial and goes back to step (b).

A second aspect of the present invention comes in a method of correcting a data read error by implementing a predetermined number of data read retrials in a digital data processing system, comprising the steps of: (a) reading a predetermined length of data out of a memory; (b) checking to see if a read error is detected in the data which has been read out of the memory; (a) checking to see if an indicator exhibits a first demonstration that a data correcting location is out of the predetermined length or a second demonstration that the data correcting location is within the predetermined length; (d) checking to see if the number of data read retrials reaches a first predetermined number in the event that the indicator exhibits the second demonstration at step (c); (a) checking to see if the read error is uncorrectable in the event that the number of data read retrials is below the first predetermined number; (f) producing an error correcting information, which includes the data correcting location, in the event that the read error is determined correctable; (g) checking to see if the data correcting location is out of the predetermined length; (h) performing error correction using the error correcting information in the event that the data correcting location is detected within the predetermined length at step (g); (i) setting the first demonstration to the indicator if the data correcting location is detected to be out of the predetermined length at step (g); (j) checking to sea if the number of the data read retrials reaches a second predetermined number after step (g) or in the event that the indicator exhibits the first demonstration at step (c) or in the event that the read error is determined uncorrectable at step (d) or in the event that the number of data read retrials reaches the first predetermined number, the second predetermined number being less than the first predetermined number; and (k) implementing the date read retrial and goes back to step (b).

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 2:
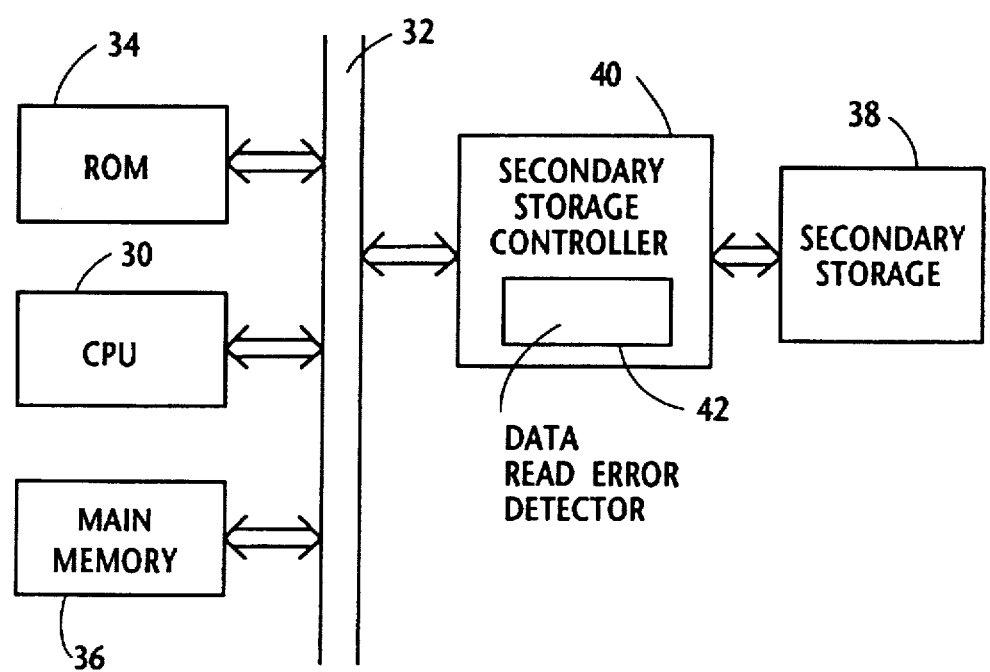
FIG. 2 is a block diagram schematically showing a digital data processing system to which the present invention is applicable.

Reference is now made to FIG. 2, wherein there is shown, in a block diagram form, a portion of a digital computer system which is directly concerned with the present invention.

A central processing unit (CPU) 30 is provided for controlling the overall operations of the system by way of a bus 32. A ROM (read only memory) 34 stores firmware via which the data error correcting steps of the present invention are executed. A main memory 36 is accessed by the CPU 10 and also stores data retrieved from a secondary storage 38 such as a magnetic tape and disk. The data retrieval from the secondary storage 38 is supervised by a secondary storage controller 40 in a known manner. A data read error detector 42, which in configured in a conventional manner, is provided within the controller 40 as illustrated.

A predetermined length of data is read from the secondary storage 38 under the control of the storage controller 40 and then stored in the main memory 36. While the data is retrieved from the secondary storage 38 to the main memory 36, error detection is performed by the data read error detector 42.

The present invention will further be discussed with reference to the flowchart of FIG. 3 which characterizes the operations of the present invention.

As mentioned above, a predetermined length of data is read out of the secondary storage 38 at step 50. Following this, a read error is checked by the error detector (step 52). If no error is found at step 52 then the routine ends at step 53. Contrarily, if the outcome of the inquiry performed at step 52 is affirmative (YES), the routine goes on to step 54, wherein the number of data read retrials (depicted by Rr) is incremented by one. It should be noted that Rr is reset to zero before the routine shown in FIG. 3 is initiated. The above mentioned steps 50, 52, 53 and 54 correspond exactly to the steps 10, 12, 13 and 14 of FIG. 1 respectively.

Subsequently, a check is made to determine if a flag has been met (e.g. to logic "1") at step 56. As is known, a flag is an indicator, usually taking the form of register, indicating a status after a mathematical or logical operation. The flag is used to specify if the error correcting length included in the error correcting information (as referred to in the prior art) exceeds the predetermined length of data retrieved from the secondary storage 38. In the instant run, the flag is not yet set to a logic "1". Accordingly, the routine goes on to step 58 wherein it is checked to see if Rr is equal to or greater than a first preset number (e.g., four). In this instance, the data read retrial is not yet implemented (viz., Rr has not yet reached 4) and hence the routine proceeds to step 60 whereat the data error detected at step 52 is chocked to determine if it is uncorrectable or not. If the answer is negative (viz., correctable), error correcting information is produced at step 62 as in the prior art.

Subsequently, at step 64, it is checked to see if the error correcting length included in the error correcting information produced at step 62 is smaller than the predetermined length of data retrieved from the storage 38. If the outcome of this enquiry is affirmative, an error correction is performed at step 66 and then the routine ends at step 67.

Contrarily, if the outcome of the inquiry at step 64 is NO, the flag is set (e.g. to logic "1") at step 68. Following this, a check is made to see if Rr is equal to or greater then a second preset number (e.g., tan) at step 70. In the instant run, the routine goes to step 72 in that Rr has not reached the second preset number.

After a data retrial is induced at step 72, the routine goes back to step 50. In the event that Rr is detected to reach the second preset number, the routine ends at step 73.

Figure 1:
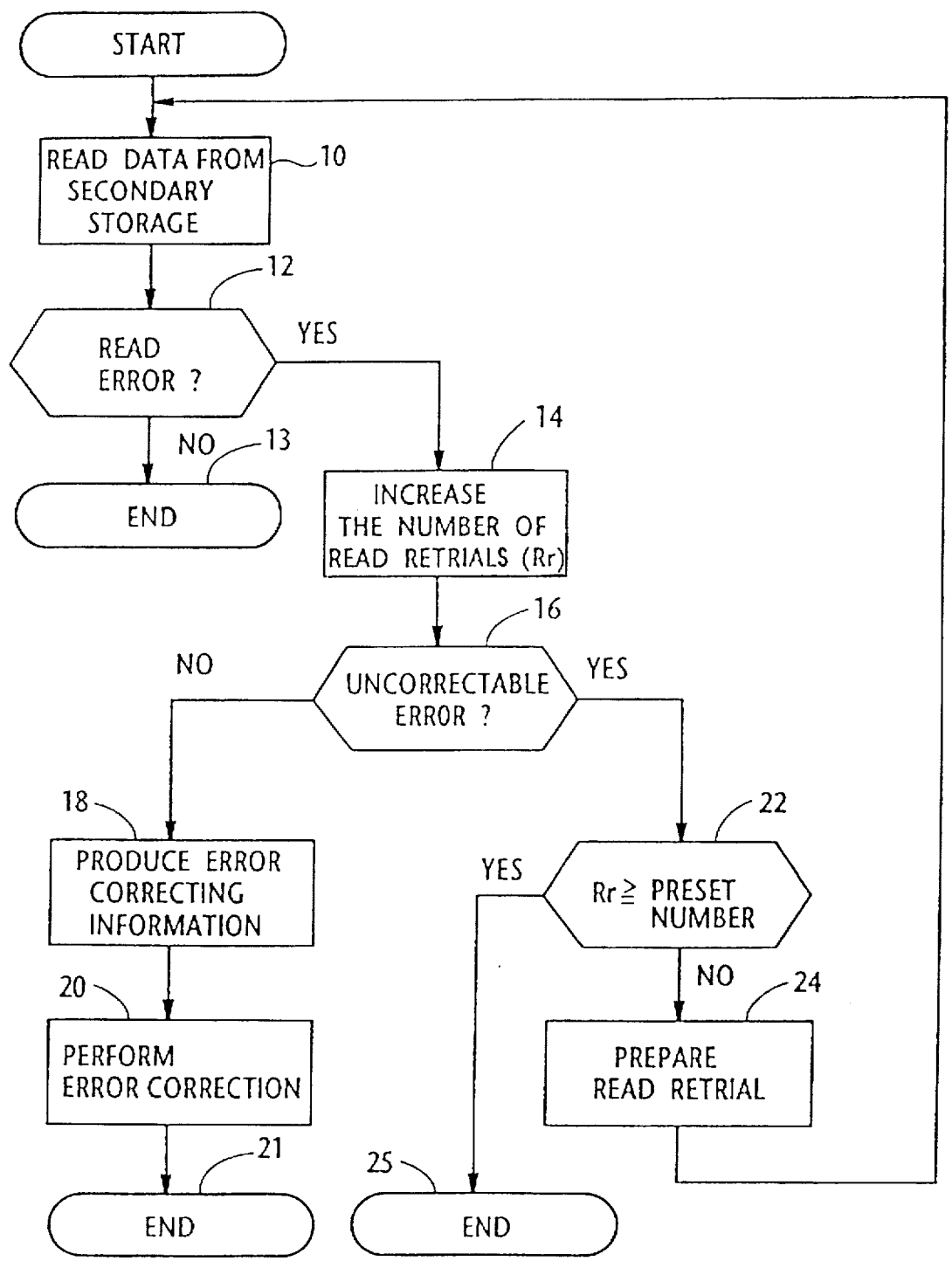
FIG. 1 is a flow chart showing the steps which are executed in accordance with the prior art discussed in the opening paragraphs of the instant disclosure.

It is understood from the foregoing that the check at step 56 limits the number of routine runs which can pass through step 60 wherein a check for an uncorrectable error is conducted, to a value which is markedly lower than that of the prior art arrangement depicted in FIG. 1. Further, if the routine passes once through the flag setting step 68, all checking for uncorrectable errors is by-passed and upon the second preset number of routine runs being reached the routine ends. Hence, the possibility that an uncorrectable error will be erroneously detected as a correctable one is greatly reduced or eliminated. This of course increases the reliability of the system operation and obviates the drawback which tends to be encountered with the prior art discussed earlier.

Figure 3:
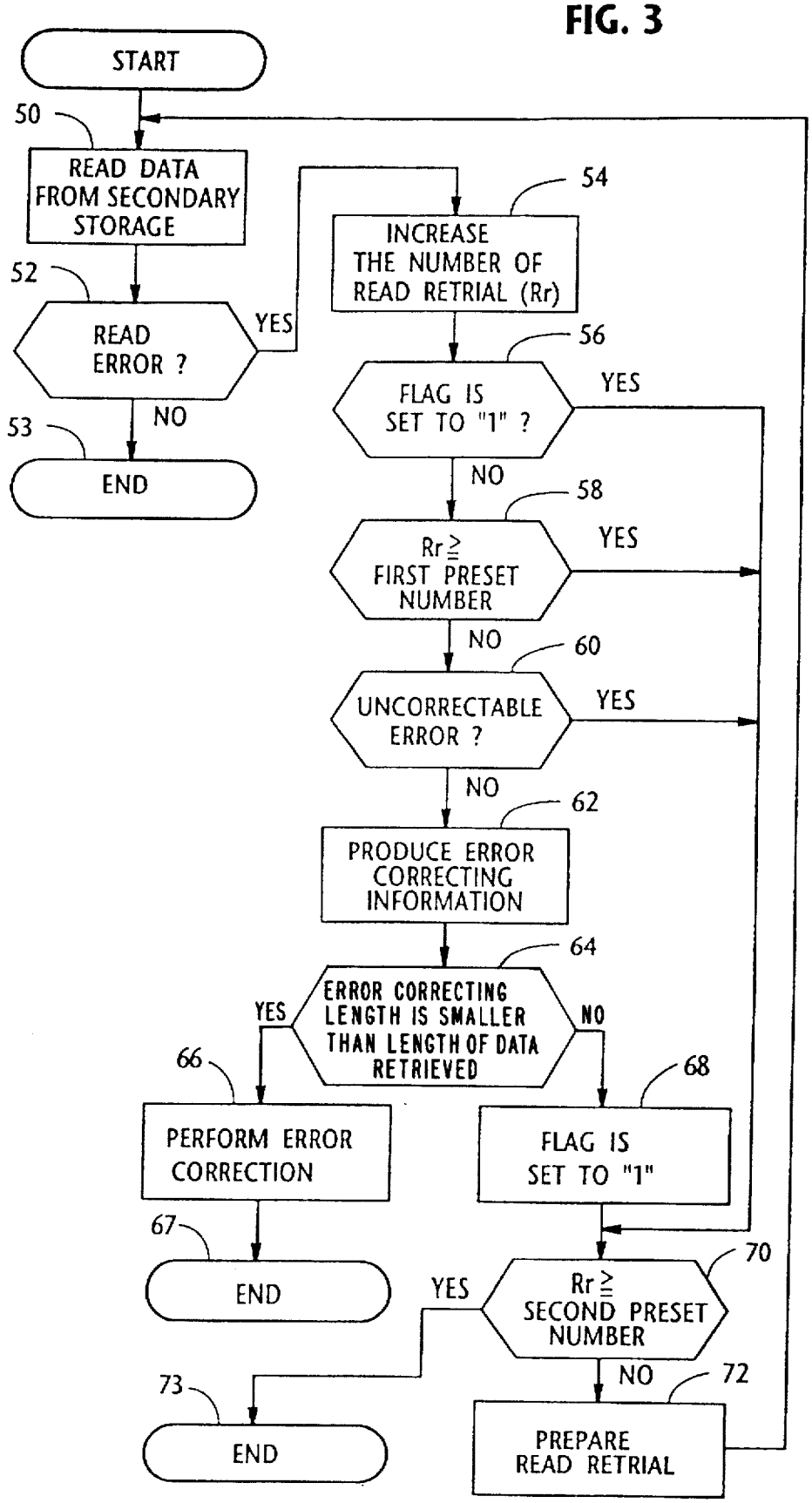
FIG. 3 is a flowchart which shows the steps which characterize the operation of the present invention.

In the above discussion, both steps 56, 60 are provided in the flowchart of FIG. 3. However, it is within the scope of the present invention to have one of steps 56, 60 included in the flowchart in question. Further, step 54 for incrementing the number of read retrials can be positioned directly before or after step 72.

It will be understood that the above disclosure is representative of only one possible embodiment of the present invention and that the concept on which the invention is based is not specifically limited thereto.

What is claimed is:

1. A method of correcting a data read error by implementing a predetermined number of data read retrials in a digital data processing system, comprising the steps of:

(a) reading out of a memory a length of data;
   (b) determining if a read error is detected in the data read out of said memory;
   (c) checking an indicator to determine if the indicator exhibits a first indication that the read error is not correctable for the length of data or exhibits a second indication that the read error is correctable for the length of data;
   (d) determining if the read error is uncorrectable in the event that said indicator exhibits the second indication at step (c);
   (e) producing error correction information if the read error is determined to be correctable at step (d);
   (f) determining if read errors are correctable for the length of data;
   (g) performing error correction using the error correction information produced in step (e) if the determination at step (f) is that read errors are correctable for the length of data;
   (h) setting the first indication if the determination at step (f) is that read errors are not correctable for the length of data;
   (i) checking if a number of data read retrials reaches a preset number when the indicator exhibits the first indication at step (c) or if the read error is determined uncorrectable at step (d); and
   (j) implementing the data read retrial and returning to step (b) if the checking of step (i) indicates that the number of data read retrials does not reach the preset number.

2. A method as claimed in claim 1, further comprising the step of:

(k) determining if the number of data read retrials reaches another preset number in the event that the indicator exhibits the second indication at step (c), said another preset number being less than said preset number;
   wherein step (d) is executed in the event that the number of data read retrials is less than said another preset number and wherein step (i) is further executed in the event that the number of data read retrials reaches said another preset number at step (k).

3. A method of correcting a data read error by implementing a predetermined number of data read retrials in a digital data processing system, comprising the steps of:

(a) reading out of a memory a length of data;
   (b) determining if a read error is detected in the data read out of said memory;
   (c) determining if an indicator exhibits a first indication that the read error is not correctable for the length of data or exhibits a second indication that the read error is correctable for the length of data;
   (d) determining if a number of data read retrials reaches a first preset number when the indicator exhibits the second indication at step (c);
   (e) determining if the read error is uncorrectable when the number of data read retrials is less than the first preset number;
   (f) producing error correcting information if the read error is determined to be correctable;
   (g) determining if read errors are correctable for the length of data;
   (h) performing error correction using the error correcting information produced in step (f) if the determination at step (g) is that read errors are correctable for the length of data;
   (i) setting the first indication in the indicator if the determination at step (g) is that read errors are not correctable for the length of data;
   (j) determining if the number of the data read retrials reaches a second preset number in the event that the indicator exhibits the first indication at step (c) or in the event that the read error is determined uncorrectable at step (e) or in the event that the number of data read retrials reaches the first preset number, the first preset number being less than the second preset number; and
   (k) implementing the data read retrial and returning the read out data to step (b) if the determining of step (j) determines that the number of data read retrials does not reach the second preset number.

* * * * *